United States Patent [19]

Ichii et al.

[11] Patent Number: 5,299,194
[45] Date of Patent: Mar. 29, 1994

[54] MULTIPLEX TRANSMISSION SYSTEM

[75] Inventors: Eiji Ichii; Hiroo Moriue, both of Hiratsuka; Hiroaki Sakamoto, Fukuyama; Yoshikazu Nobutoki, Higashihiroshima; Koji Terayama, Hiroshima, all of Japan

[73] Assignees: The Furukawa Electric Co., Ltd., Tokyo; Mazda Motor Corp., Hiroshima, both of Japan

[21] Appl. No.: 977,570

[22] Filed: Nov. 17, 1992

[30] Foreign Application Priority Data

Nov. 18, 1991 [JP] Japan ................................. 3-301743

[51] Int. Cl.$^5$ ............................................ H04L 12/40
[52] U.S. Cl. ................................ 370/85.3; 340/825.16; 370/85.6
[58] Field of Search ............... 340/825.16, 825.06; 370/85.1, 85.2, 85.3, 85.6, 91, 94.1; 371/32, 33

[56] References Cited

U.S. PATENT DOCUMENTS 4,689,785  8/1987  Toyonaga et al. ................. 370/85.3
5,042,029  8/1991  Hayakawa ............................ 370/13
5,090,012  2/1992  Kajiyama et al. ................. 370/85.3

Primary Examiner—Benedict V. Safourek
Attorney, Agent, or Firm—Frishauf, Holtz, Goodman & Woodward

[57] ABSTRACT

A multiplex transmission system according to this invention includes a plurality of multiplex nodes connected to one another via a common multiplex bus, for effecting data transfer between the nodes. When reception nodes correctly receive data transmitted from one of the nodes for each frame, each of the reception nodes returns an ACK signal to the multiplex bus, registers all of the nodes connected to the multiplex bus into the ACK table in response to the ACK signal, and effects the ACK management. In this case, for example, if a door FR multiplex node causes an interruption to transmit a frame while an air-conditioning unit multiplex node is retransmitting a frame, the air-conditioning unit multiplex node effects the ACK management without regarding the ACK signal for the interruption frame as an object of the updating logic of its own ACK table.

5 Claims, 5 Drawing Sheets

FIG. 2

| SOM | PRI ID | CONT. | DATA 1 | DATA 2 | DATA 3 | DATA 4 | CRC | EOD | ACK | 1 | 2 | 3 | 4 | 5 | 6 | ~ | 21 | 22 | 23 | 24 |

ACK TABLE 20

| | 1 | 2 | 3 | 4 | 5 | 6 | --- | 23 | 24 |
|---|---|---|---|---|---|---|---|---|---|
| METER MULTIPLEX NODE 11 | 1 | 1 | 1 | 1 | 1 | 1 | | 0 | 0 |
| AIR-CONDITIONING UNIT MULTIPLEX NODE 12 | 1 | 1 | 1 | 1 | 1 | 1 | | 0 | 0 |
| AIR-CONDITIONING SWITCH MULTIPLEX NODE 13 | 1 | 1 | 1 | 1 | 1 | 1 | | 0 | 0 |
| DOOR FL MULTIPLEX NODE 14 | 1 | 1 | 1 | 1 | 1 | 1 | | 0 | 0 |
| DOOR FR MULTIPLEX NODE 15 | 1 | 1 | 1 | 1 | 1 | 1 | | 0 | 0 |

ACK TABLE 20 (after)

| | 1 | 2 | 3 | 4 | 5 | 6 | --- | 23 | 24 |
|---|---|---|---|---|---|---|---|---|---|
| METER | 1 | 1 | 0 | 1 | 1 | 0 | | 0 | 0 |
| AIR-COND UNIT | 1 | 1 | 0 | 1 | 1 | 0 | | 0 | 0 |
| AIR-COND SW | 1 | 1 | 0 | 1 | 1 | 0 | | 0 | 0 |
| DOOR FL | 1 | 1 | 0 | 1 | 1 | 0 | | 0 | 0 |
| DOOR FR | 1 | 1 | 0 | 1 | 1 | 0 | | 0 | 0 |

MULTIPLEX TRANSMISSION SYSTEM

BACKGROUND OF THE INVENTION

1. Field of the Invention

This invention relates to a multiplex transmission system utilizing a so-called CSMA/CD (Carrier Sense Multiple Access/Collision Detection) transmission system.

2. Description of the Related Art

This type of transmission system includes a nondestructive arbitration type CSMA/CD access system used for multiplex transmission for cars as shown in FIG. 1, for example.

In the above system, a network is constructed by connecting a plurality of multiplex nodes such as a meter multiplex node 11, an air-conditioning unit multiplex node 12 for controlling the air conditioner in the car, an air-conditioning switch multiplex node 13 for controlling the operation switches of the air conditioner, a door FL (front left) multiplex node 14 and a door FR (front right) multiplex node 15 to one another via a common multiplex transmission path (multiplex bus) 16 constructed by paired electric lines.

The above multiplex nodes each include a computer for communications and the computers are operated independently of one another. Each computer transmits signals representing vehicle driving information serially to the multiplex bus in units of data frame at a desired timing and in a multiplex mode.

For this reason, contentions of messages may occur on the multiplex bus, and in order to resolve the contention, priorities are assigned to the messages in the conventional system. Each computer effects the priority control according to the transmission procedure based on the assigned priorities without destroying the message. That is, each computer automatically interrupts the transmission of a lower-priority message based on the priority control and continuously effects the transmission of a higher priority message.

Each of the multiplex nodes 11 to 15 returns an ACK signal (acknowledge signal) to the storage location of the frame corresponding to a corresponding one of inherent addresses assigned to the respective nodes when reception of data is normally completed. In an embodiment, the respective nodes are assigned with the inherent addresses 1 to 5, and the meter multiplex node 11, air-conditioning unit multiplex node 12, air-conditioning switch multiplex node 13, door FL multiplex node 14 and door FR multiplex node 15 respectively return ACK signals in response to ACK1 to ACK5, for example.

The above multiplex transmission system has a system construction as is disclosed in U.S. Pat. No. 4,951,281, for example. In the multiplex transmission system, each of the multiplex nodes has an ACK table and registers all of the nodes connected to the multiplex bus into the ACK table in response to the returned ACK signal. Each of the multiplex nodes effects the ACK management operation based on the ACK managing function for newly registering a multiplex node corresponding to the returned ACK signal when the number of returned ACK signals is increased, and canceling the registration of a multiplex node when the multiplex node does not return an ACK signal even if data is repeatedly transmitted thereto a preset number of times.

In the above multiplex transmission system, a problem arises when a multiplex node interrupts and starts to transmit a frame while another multiplex node is retransmitting data. Namely, an ACK signal may be returned from the node to which data is being retransmitted to the interrupt frame. This ACK signal is normal as far as the retransmitted data is concerned, but it causes a situation similar to that where an ACK signal is generated due to noise. In the case of the above multiplex transmission system for cars, the relationship between the transmission nodes and the ACK return nodes is established as shown in the following Table 1, for example.

TABLE 1

| Transmission node | ACK return node | | | | |
| --- | --- | --- | --- | --- | --- |
| | Meter | Air-conditioning unit | Air-conditioning switch | Door FL | Door FR |
| (1) Meter | O | O | O | O | O |
| (2) Air-conditioning unit | O | O | O | X | O |
| (3) Air-conditioning unit re-transmission | O | O | O | X | O |
| (4) Door FR | O | O | O | O | O |
| (5) Air-conditioning unit re-transmission | O | O | O | X | O |
| (6) Air-conditioning unit re-transmission | O | O | O | X | O |

In this case, the mark O indicates that an ACK signal is returned and the mark x indicates that an ACK signal is not returned.

At the time of transmission by the meter multiplex node 11, the five multiplex nodes 11 to 15 return ACK signals. For this reason, all of the nodes 11 to 15 are registered. Next, at the time of transmission by the air-conditioning unit multiplex node 12, the door FL multiplex node 14 does not return an ACK signal. Therefore, the air-conditioning unit multiplex node 12 effects the first retransmission, but before the retransmission is completed, a frame from the door FR multiplex node 15 having the higher priority than a frame from the air-conditioning unit multiplex node 12 causes an interruption. If, in this case, the door FL multiplex node 14 returns its ACK signal in response to the interruption frame, all nodes register the door FL multiplex node in their ACK tables. As a result, the air-conditioning unit multiplex node 12 stops the retransmission, and since the retransmission is stopped, some nodes cannot receive the data from the air-conditioning unit multiplex node 12. Further, an abnormal node in the network cannot be detected.

That is, in this case, the node which does not detect the abnormal node (door FL multiplex node 14) effects the retransmission without fail. For this reason, in this example, the possibility of collision of messages becomes high and the data transmission amount, that is, the traffic amount is increased so that it may take a long time to transmit the message. Further, if the above condition occurs when the car driving operation is controlled while the car engine control unit and suspension control unit communicate with each other, a certain node detects the abnormal condition and starts to effect the degradation control and other nodes effect the same control operation as in the normal state, and as a result, the performance of the car may be significantly deteriorated.

SUMMARY OF THE INVENTION

This invention has been made in view of the above problems and an object of this invention is to provide a multiplex transmission system capable of effecting the highly reliable ACK management operation.

The above object can be attained by a multiplex transmission system which comprises a plurality of nodes connected to one another via a common transmission path, wherein when a reception node correctly receives data transmitted from one of the nodes for each frame, each of the nodes returns a reception recognition signal to the transmission path, at least one of the nodes registers all of the nodes connected to the transmission path into registration means in response to the returned reception recognition signal, controls the reception recognition and changes the updating logic of the registration means in a case where another node causes an interruption to transmit a frame while the transmission node is retransmitting the frame.

According to the above multiplex transmission system, the ACK management operation is restricted when the ACK signal is returned in response to the frame retransmission, and when another node causes an interruption to transmit a frame, each of the multiplex nodes changes the updating logic of the ACK table which is the registration means. As a result, an abnormal node can be detected without fail, the possibility of collision of messages can be decreased, and the traffic amount of can be reduced.

Preferably, when a node transmits a frame during the frame retransmission by another transmission node, at least this transmission node effects the ACK management so as not to effect the additional registration of the node into the ACK table corresponding to the frame. As a result, the ACK management can be stably effected by use of the multiplex transmission system even when an error caused by the influence of noise occurs in the content of the frame to set the same condition as that set when an ACK signal is returned.

BRIEF DESCRIPTION OF THE DRAWINGS

FIG. 2 is a diagram showing an example of the message format of a data frame;

FIGS. 3(a) and 3(b) are diagrams showing a first embodiment of the updating state of an ACK table of the multiplex transmission system according to this invention;

FIGS. 5(a) and (b) are diagrams showing a second embodiment of the updating state of an ACK table of the multiplex transmission system according to this invention.

DETAILED DESCRIPTION OF THE PREFERRED EMBODIMENTS

Figure 1:
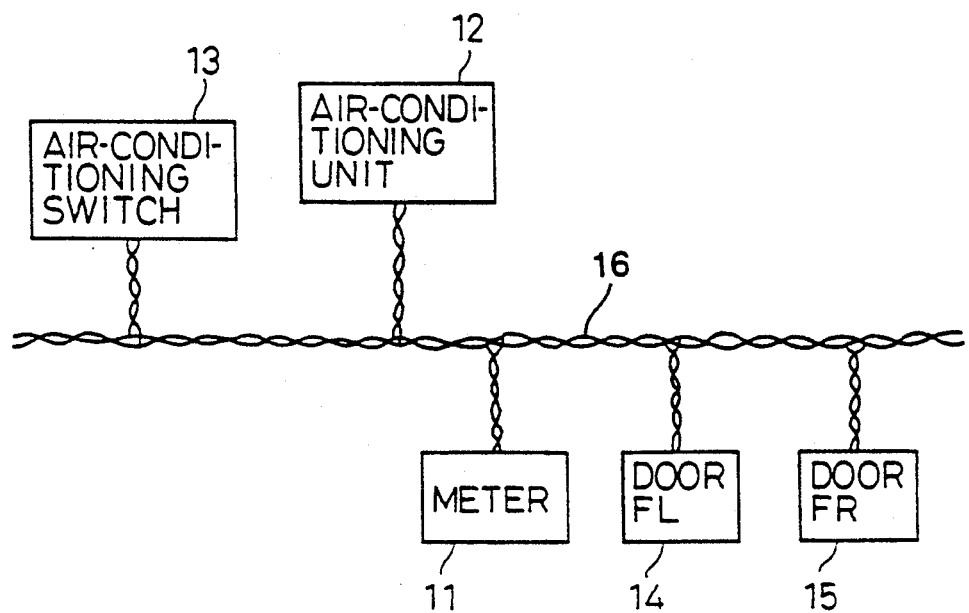
FIG. 1 is a system construction diagram showing a multiplex transmission system for cars using the nondestructive arbitration type CSMA/CD access system.

The system construction of a multiplex transmission system for cars using the nondestructive arbitration type CSMA/CD access system is the same as the conventional construction shown in FIG. 1 and the ACK management is effected not only at the time of frame transmission but also at the time of frame reception. The ACK table used for the ACK management is, in this example, made to be the same as the ACK table used for the transmission, for economical purposes such as reduction of the manufacturing cost and the like. Further, each of the multiplex nodes has ACK table updating counters which correspond in number to the maximum number of nodes which can be connected to the network, and therefore, each multiplex node can detect the abnormal state of the node as soon possible.

Further, as shown in FIG. 2, the message format of a data frame transmitted by means of the above network is constructed by a message format which is normally transferred in the multiplex transmission system. That is, the data frame is constructed by SOM (Start Of Message) indicating the start of the message, priority (PRI) for determining the priority of a plurality of multiplex nodes when the multiplex nodes simultaneously transmit data items to the multiplex bus, message ID indicating the contents of succeeding data items (DATA), control data area (CONT) containing data indicating the data length, data areas (DATA1 to DATA4) having the length (variable length) indicated by CONT, error check code such as CRC, EOD (End Of Data) indicating the end of data, ACK signal area for storing ACK signals returned from the individual multiplex nodes in bit-by-bit correspondence, and EOM (End Of Message) indicating the end of the message.

Next, the updating of the ACK table by the ACK management function of the above system will be explained with reference to FIG. 3 which shows a registration means formed by a storage device for storing ACK tables. The ACK management operation of this system according to the first embodiment is hereinafter described on the assumption that the air-conditioning unit multiplex node 12 is a transmission or sending node. Suppose that the frame retransmission by the transmission node 12 is interrupted by a frame from the door FL multiplex node 14. In this case, even if extra ACK signals are returned from the multiplex nodes in response to the interrupt frame (see Table 1), the transmission multiplex node changes the updating logic such that the extra signals are ignored and are not reflected in the updating of the ACK table. In this case, the number of retransmission operations is set to 3.

In FIG. 1, the meter multiplex node 11 effects the frame transmitting operation of transmitting a frame via the multiplex bus 16. Since the five multiplex nodes 11 to 15 return ACK signals in response to the frame transmission (refer to (1) in Table 1), all of the multiplex nodes that return the ACK signals are registered into the ACK table of each of the multiplex nodes connected to the multiplex bus 16 (refer to FIG. 3(a)). Next, if the door FL multiplex node 14 does not return an ACK signal at the time of frame transmission by the air-conditioning unit multiplex node 12 (refer to (2) in Table 1), the air-conditioning unit multiplex node 1i retransmits the frame.

Figures 3A, 3B:
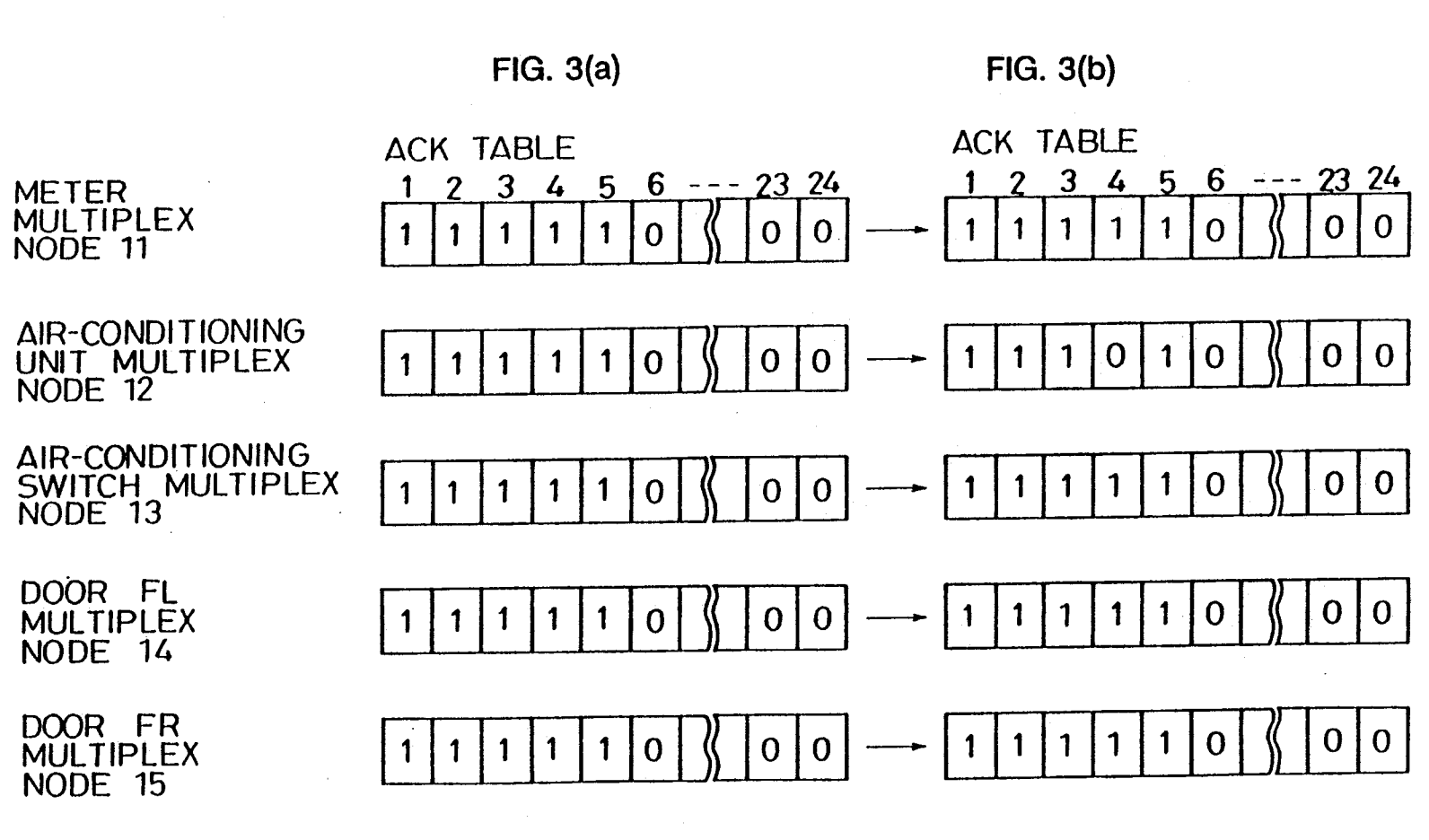

In this case, assume that a frame of the door FR multiplex node 15 having the higher priority than the frame of the air-conditioning unit multiplex node 12 causes an interruption before the retransmitting operation is completed and the door FL multiplex node 14 returns the ACK signal for the frame (refer to (4) in Table 1). In this case, the multiplex nodes except the air-conditioning unit multiplex node 12 register the ACK signal into the respective ACK tables as an object subjected to the ACK management. However, since the air-conditioning unit multiplex node 12 neglects the ACK signal for the frame which causes an interruption in the retransmitting operation even if the number of the ACK signals is increased, it does not regard the ACK signal returned by the door FL multiplex node 14 as an object which causes the ACK table to be updated. That is, since the door FL multiplex node 14 does not return an ACK signal by four successive times in the frame transmission by the air-conditioning unit multiplex node 12 in the cases (2), (3), (5) and (6) of Table 1, the ACK table of the air-conditioning unit multiplex node 12 is updated at the time of completion of the retransmission in the case (6) of Table 1 as shown in FIG. 3(b).

Therefore, in this embodiment, even if an ACK signal is returned from each of the multiplex nodes in response to the frame transmitted from a multiplex node which causes an interruption in the frame retransmitting operation by the transmission multiplex node, it does not regard the ACK signal as an object which causes the ACK table to be updated, and as a result, the transmission multiplex node can detect that the ACK signal is not returned by four successive times at the time of completion of the retransmitting operation and can update the ACK table without fail. Consequently, an abnormal node can be detected without fail, the possibility of collision of messages can be lowered and the traffic amount can be reduced. Further, the ACK management can be attained, for example, even if an error caused by the influence of noise inherent to the car occurs in the content of the frame to set the same condition as that set when an ACK signal is returned.

Figure 4:
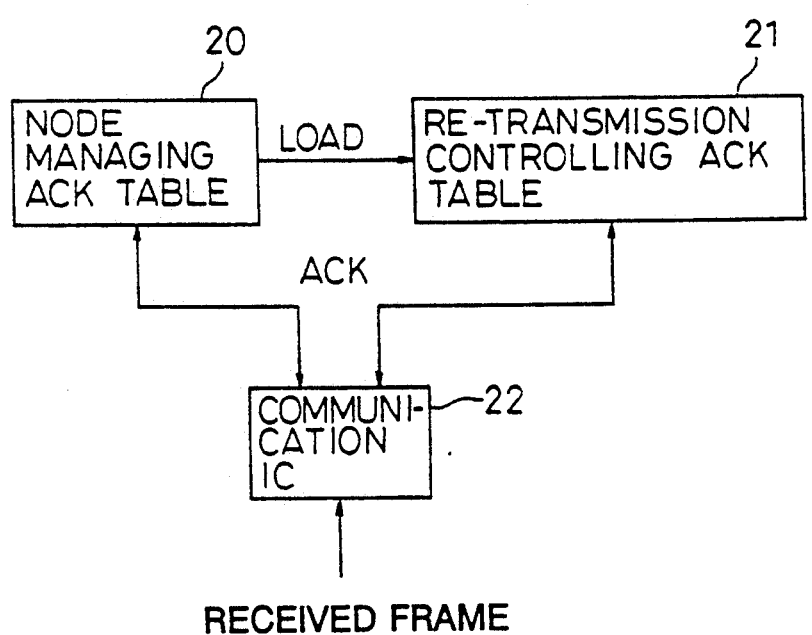
FIG. 4 is a diagram showing an example of the construction in which two ACK tables are provided in the multiplex node.

In the first embodiment described above, since the number of counters for updating the ACK table of each of the multiplex nodes must be set equal to the number of nodes connected to the network, a relatively large number of gates may be necessary. Therefore, as a more preferable example of this invention, each of the multiplex nodes is designed to have a node managing ACK table 20 and a retransmission controlling ACK table 21 as shown in FIG. 4. In this embodiment, the operations of registering and updating the ACK tables 20 and 21 in response to an ACK signal received from the multiplex bus are effected under the control of a communication IC 22 and the ACK management operations are separately effected. The ACK management may be carried out internally of the CPU.

That is, the communication IC 22 effects the ACK signal management operation for the node managing ACK table 20 for each frame by comparing the ACK in the frame with the ACK registered in the ACK table 20. For example, if an ACK of a node B is set into the absent state while a counter provided in the communication IC 22 is counting the ACK-absent state of a node A in the node managing ACK table 20, the counter starts to count the node B after it has counted the ACK-absent state of the node A. With this design, the communication IC 22 is only required to have a single counter for the node management and the number of gates can be reduced.

Further, in the transmission multiplex node, the communication IC 22 causes ACK registered in the node managing ACK table 20 to be loaded into the retransmission controlling ACK table 21 at the transmission starting time. Then, the communication IC 22 counts the number of retransmissions by use of the counter based on the ACK registered in the retransmission controlling ACK table 21 until an ACK signal is returned from all of the nodes connected to the network by at least one time, and effects the retransmissions a preset number of times, for example, three times. As a result, the communication IC 22 is only required to have a single counter for the retransmission control and the number of gates can be reduced.

Next, the updating state of the ACK table attained by the ACK managing function of this system is explained with reference to a second embodiment shown in FIG. 5. As shown by an example of Table 2, in this embodiment, in a case where an ACK signal is not returned from a predetermined node (air-conditioning switch multiplex node 13) while the air-conditioning unit multiplex node 12 is transmitting a frame and when an ACK signal including an ACK signal for the frame of the door FR multiplex node 15 which has caused an interruption is not returned a preset number of successive times, the ACK table 20 is updated. In this embodiment, the number of retransmissions is set to 3.

TABLE 2

| Transmission node | ACK return node | | | | |
|---|---|---|---|---|---|
| | Meter | Air-conditioning unit | Air-conditioning switch | Door FL | Door FR |
| (1) Meter | O | O | O | O | O |
| (2) Air-conditioning unit | O | O | X | O | O |
| (3) Door FR | O | O | X | O | O |
| (4) Door FR retransmission | O | O | X | O | O |
| (5) Door FR retransmission | O | O | X | O | O |
| (6) Door FR retransmission | O | O | X | O | O |
| (7) Air-conditioning unit retransmission | O | O | X | O | O |
| (8) Air-conditioning unit retransmission | O | O | X | O | O |
| (9) Air-conditioning unit retransmission | O | O | X | O | O |

In FIG. 1, the meter multiplex node 11 effects the frame transmission operation of transmitting a frame via the multiplex bus 16. Since the five multiplex nodes 11 to 15 return ACK signals in response to the frame transmission (refer to (1) in Table 2), all of the multiplex nodes that return the ACK signals are registered in the node managing ACK table 20 in each of the multiplex nodes (refer to FIG. 5(a)). Next, if the air-conditioning switch multiplex node 13 does not return an ACK signal in response to the frame transmission by the air-conditioning unit multiplex node 12 (refer to (2) in Table 2), the air-conditioning unit multiplex node 12 tries to retransmit the frame.

In this case, if a frame of the door FR multiplex node 15 having the higher priority than the frame of the air-conditioning unit multiplex node 12 causes an interruption before the retransmitting operation and the air-conditioning switch multiplex node 13 does not return the ACK signal for the frame (refer to (3) in Table 2), then the door FR multiplex node 15 retransmits the frame.

Since the door FR multiplex node 15 does not update its own node managing ACK table 20 at the time of (3) in Table 2, the door FR multiplex node 15 loads the content registered in the ACK table 20 shown in FIG. 5(a) into its own retransmission controlling ACK table 21. Then, the door FR multiplex node 15 continuously effects the retransmissions by three times as shown by (4) to (6) in Table 2.

In all of the multiplex nodes 11, 12, 14 and 15 other than the air-conditioning switch multiplex node 13, it is determined at the time of completion of the retransmission shown by (5) of Table 2 that the ACK signal is not returned from the air-conditioning switch multiplex node 13 by four successive times. Then, the multiplex nodes 11, 12, 14 and 15 determine that the air-conditioning switch multiplex node 13 is set in the abnormal state, and as shown in FIG. 5(b), update their own node managing ACK tables 20 to remove the air-conditioning switch multiplex node 13. However, since the counter in the air-conditioning unit multiplex node 12 does not count the number of retransmissions, it can hold the three retransmissions of (7) to (9) in Table 2.

Thus, in this embodiment, since the ACK table can be updated even in the frame retransmission at the time when an ACK signal is not returned, each of the multiplex nodes can detect the multiplex node set in the abnormal state at an earlier time in comparison with a case of the first embodiment, thereby making it possible to enhance the reliability of the system. Further, the number of counters required for each multiplex node is two for node management and retransmission control and the number of gates can be reduced.

For example, in order to reduce the circuit scale in this invention, an ACK table can be commonly used for node management and retransmission control, and in this case, it becomes necessary to reset the counter at the transmission starting time.

What is claimed is:

1. A multiplex transmission system comprising:
a plurality of nodes,
common transmission path means for connecting said nodes to each other so as to effect data transmission between said plurality of nodes,
wherein each of said nodes returns a reception recognition signal to said transmission path means when a respective reception node normally receives data transmitted from any one of said nodes for a frame,
at least one of said nodes including:
table means for managing the state of each node connected to said transmission path means, and
means for:
registering a corresponding node in said table means when the reception recognition signal is returned for receipt in each said frame, and
removing said corresponding node from said table means in the case where the node which does not receive said reception recognition signal exists even if the frame is retransmitted a predetermined number of times, and
wherein updating registration of a node into said table means in response to the received frame is not executed in the case where during retransmission of said frame, a frame transmitted from another node interrupts.

2. A multiplex transmission system comprising:
a plurality of nodes,
common transmission path means for connecting said nodes to each other so as to effect data transmission between said plurality of nodes,
wherein each of said nodes returns a reception recognition signal to said transmission path means when a respective reception node normally receives data transmitted from any one of said nodes for each frame, and
at least one of said nodes including:
first table means for managing the state of each node connected to said transmission path means,
second table means for controlling retransmission of said frame when said reception recognition signal is not returned, and
means for:
registering a corresponding node in said first table means when the reception recognition signal is normally received for receipt of said frame, and
removing said corresponding node from said first table means in the case where the node which does not continuously return said reception recognition signal a predetermined number of times exists even if the frame is transmitted, and
wherein when said frame is transmitted, retransmission of said frame is executed the predetermined number of times until said reception registration signal is returned from all nodes registered in said second table means.

3. A multiplex transmission system according to claim 2, wherein at least one of said nodes loads contents of said first table means into said second table means at the start of a frame transmission, and executes a control of the frame retransmission.

4. A multiplex transmission system according to claim 2, wherein at least one of said nodes compares the state of the reception recognition signal in said frame with the content of said first table means for receipt of the frame, and executes an ACK management operation.

5. A multiplex transmission system according to claim 4, wherein at least one of said nodes includes counter means for counting an absent state of the reception recognition signal from a determined multiplex node on the basis of a result of the comparison of the state of the reception recognition signal in said received frame and the contents of said first table means, and for counting an absent state of the reception recognition signal from another said node after the absent state of the reception recognition signal from said determined multiplex node is counted if an absent state of the reception recognition signal from another multiplex node is set during counting, to effect said ACK management operation.

* * * * *